United States Patent [19]

Yamada et al.

[11] 4,187,616

[45] Feb. 12, 1980

[54] METHOD FOR COOLING AGED BOARD MATERIAL

[75] Inventors: Hirofumi Yamada; Noboru Takaki; Michio Masuda, all of Amagasaki, Japan

[73] Assignee: Kubota, Ltd., Osaka, Japan

[21] Appl. No.: 904,519

[22] Filed: May 10, 1978

[30] Foreign Application Priority Data

May 13, 1977 [JP] Japan ............... 52/055764

[51] Int. Cl.² ............... F26B 7/00; F26B 5/04
[52] U.S. Cl. ............... 34/13; 34/15; 34/16
[58] Field of Search ............... 34/13, 15, 16, 62

[56] References Cited

U.S. PATENT DOCUMENTS 1,678,559  7/1928  Devine ............... 34/15
2,874,481  2/1959  Lofgren et al. ............... 34/62

Primary Examiner—John J. Camby
Attorney, Agent, or Firm—Moonray Kojima

[57] ABSTRACT

A method of cooling board materials of inorganic substance wherein after aging treatment in an autoclave using saturated steam of high temperature and high pressure, the board material is left in the autoclave and the pressure therein is reduced to less than one atmosphere, and then the reduced pressure is retained at a stationary state until the temperature of the board material falls to about the temperature at which water does not boil, and then removing the board material from the autoclave. The board material may also be subjected to a drying treatment by alternately supplying saturated steam and reduced pressure after aging and prior to cooling.

7 Claims, 2 Drawing Figures

4,187,616

METHOD FOR COOLING AGED BOARD MATERIAL

BACKGROUND OF THE INVENTION

This invention relates to an improved method of cooling board material of inorganic substance, such as calcium silicate or asbestos-cement, after aging of the board material in an autoclave.

In aging board material comprising calcium silicate, Tobemonite or Zonotlite is generated from exothermic hydration reaction between silicic acid family compound and lime family compound. It is necessary to age the board material under high temperature and high pressure, for example, using saturated steam of 160° C., in for example an autoclave. When the board material is of asbestos-cement, the aging can be done in an autoclave, and the Tobermonite crystals are formed by exothermic hydration reaction between compounded raw materials of silica sand and cement.

When using an autoclave for aging treatment, a number of unaged boards are piled within the autoclave and then the autoclave is heated using saturated steam of high temperature and high pressure. At the end of the aging step, the temperature of the aged board is so high (e.g. 150° C.) that in order for the boards to be further treated, they must first be cooled properly. This cooling was done in the prior art by introducing outdoor atmospheric air into the autoclave by opening the cover thereof.

However, disadvantageously, in this type of cooling, cracks are easily generated when the heat is suddenly released from the board upon contact with the outer atmosphere. Also, it is difficult to keep the boards in a dried state after cooling. Generally, the aged board has numerous tiny pores. During the reduction of pressure in the autoclave, pressure within the pores is also reduced. Steam is generated in the pores, but cannot be readily diffused. Thus, in the prior art, a separate drying room is used. This is expensive in terms of capital expenditure for capital equipment and for added step of drying and manpower required to maintain the equipment. Furthermore, the autoclave used has a cover on one end. Thus, when atmospheric air is introduced, cooling is not uniform throughout the autoclave, and the board materials will cool at different rates depending upon their location in the autoclave. To compensate, cooling is done for a longer period of time.

SUMMARY OF THE INVENTION

Accordingly, an object of the invention is to eliminate the foregoing and other deficiencies and disadvantages of the prior art.

The present invention encompasses a method for cooling inorganic substance board material, wherein, after aging the board material in an autoclave using saturated steam of high temperature and high pressure for a suitable time, the pressure within the autoclave is reduced to less than one atmosphere, and then the resulting reduced pressure is maintained for a suitable length of time until the temperature of the board material reaches a temperature at which the water does not boil at that reduced pressure, and finally, the autoclave is opened and the board material removed.

When the pressure within the autoclave is reduced, the pressure in the numerous tiny pores in the boards would also be reduced. Consequently, the water in the tiny pores of the aged board material easily evaporates boilingly under reduced pressure. When vaporizing water from the pores, latent heat is necessary for the vaporizing. Thus, when steam escapes from the pores, latent heat is also lost from the pores, thereby cooling the board material. Evaporation of water from the pores may continue until the temperature of the board material reaches a temperature at which water no longer evaporates at the reduced pressure within the autoclave. The final reduced pressure state within the autoclave is continued until the board material reaches the temperature at which water no longer boils at that reduced pressure. In this case that temperature (T°C.) is higher than the temperature of atmospheric air. After that, the cover of the autoclave is removed and the cooled boards are removed from the autoclave. The tiny pores under reduced pressure gradually cools by sucking in outer atmospheric cool air thereinto. The boards are advantageously cooled from the inside by action of the vaporizing of water through the pores. Thus, advantageously, using the invention method, cracks are prevented from forming. Also, such action contributes to enhancement of drying efficiency. Also, such inventive method eliminates the necessity of an added drying location and added drying equipment and added process step, thereby resulting in considerable savings of time, manpower and money.

Furthermore, advantageously, uniform reduced pressure can be maintained in the autoclave for all boards, and thus, the boards are uniformly cooled and dried regardless of their location within the autoclave. The boards are dried and cooled without any cracks being generated. Also, advantageously, the cooling rate is changeable according to the amount of water being evaporated since cooling is accomplished by evaporation of water from the tiny pores.

DETAILED DESCRIPTION OF PREFERRED EMBODIMENTS

Figure 1:
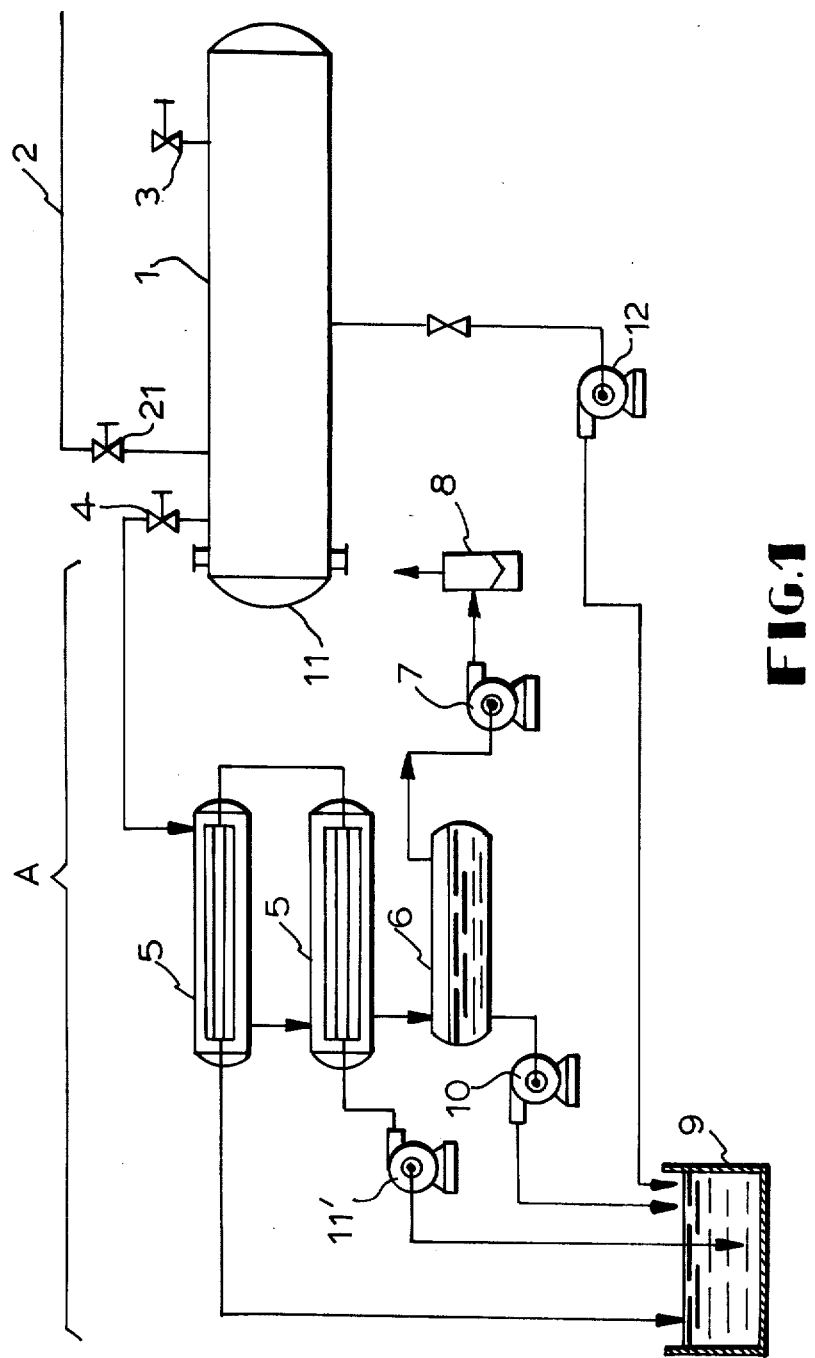
FIG. 1 depicts diagramatically an illustrative set of equipment used in the performance of the invention.

The quantity of water evaporated from the board material can be quantitatively calculated.

Presuming gas of reduced pressure "$p_1$" and "$p_2$" exists in two rooms separated by a separating wall having a hole of area "A" and dimensions of area "A" being far smaller than the mean free motion path length of the gas molecules, flowing-in quantity "$Q_1$" of the gas from room "1" of pressure "$p_1$" to room "2" of pressure "$p_2$", can be shown as follows:

$$Q_1 = \bar{V}/4 \, A p_1$$

wherein "V" denotes mean molecular motion velocity.

On the other hand, the flowing-in quantity $Q_2$ of the gas from room "2" of pressure "$p_2$" to room "1" of pressure "$p_1$" can be shown as follows:

$$Q_2 = \bar{V}/4 \, A p_2$$

Accordingly, if "$p_1$" is greater than "$p_2$", the flowing in quantity of "$p_1$" to the side of gas of "$p_2$" is shown as follows:

$$Q = Q_1 - Q_2 = \bar{V}/4 \, (A)(p_1 - p_2) \quad (1)$$

On the other hand, mean free motion velocity V of gas of molecular weight "M" at absolute temperature "T" can be shown as follows:

$$V = \sqrt{8RT/\pi M} \quad (2)$$

wherein "R=LK" and "L" denotes Avogadro's number and "K" denotes Boltzmann constant ($1.38 \times 10^{-16}$ erg/degree).

Accordingly, from equation (1) and (2), $$Q = A(\frac{RT}{2\pi M})^{\frac{1}{2}} (p_1 - p_2) = 3.638 A (\frac{T}{M})^{\frac{1}{2}} (p_1 - p_2) \quad (3)$$

In the present invention, the quantity of water evaporated under reduced pressure affects the speed of cooling of the board material, as can be understood from equation (3) using "$p_1$" as the pressure inside the autoclave, and "$p_2$" as the pressure in the tiny pores, and "T" as the temperature at which the water boils at the reduced pressure.

Meanwhile in regard to progress of drying of the board material accompanied by cooling thereof can be seen from the following discussion.

Presuming water content of the board material is "x%" by weight based on the bone dried board material weight, and "a" is specific heat of bone dried board material, specific heat "k" of the board material which contains water of "x%" by weight is shown as follows:

$$k = \frac{x}{100} + \frac{a(100-x)}{100} \quad (1')$$

Presuming latent heat for evaporation of water is "b" Kcal/kg "$\Delta w$" kg water evaporizes from material of "B" kg weight, and temperature of the board material falls by "$\Delta T$" owing to the above equation, and the following equation applies:

$$\Delta W = (\Delta T k B)/b \quad (2')$$

Presuming "$\Delta x$" is reduction of water content % by weight of the board material owing to evaporation of water therefrom by "$\Delta W$" quantity, "$\Delta W$" can be shown as follows:

$$(\Delta x)/100 \, B = \Delta W \quad (3')$$

Based on equations (1') and (3'), the following equation can be shown:

$$\Delta T = \frac{b \, \Delta x}{(1-a)(x + \frac{100a}{1-a})} \quad (4')$$

When "$x_1$" is initial water content by percent by weight of the board material and "$T_1$" is initial temperature of same, water content "x" of the boafd material at temperature "T" is shown as follows from equation (4'):

$$\frac{b}{(1-a)} \left( \log (x + \frac{100a}{1-a}) \right)_x^{x_1} = T_1 - T$$

and therefore, $$x = (x_1 + \frac{100a}{1-a}) e^{-\frac{1}{b}(1-a)(T_1-T)} - \frac{100a}{1-a} \quad (5')$$

That is to say, in accordance with the present invention, water content percent by weight of the board material can be shown by equation (5') when "$x_1$" denotes water content percent by weight of the board material just after aging thereof, "$T_1$" denotes temperature of the board material just after aging, and "T" denotes final temperature of the board material in the autoclave at the end of the vacuum cooling treatment.

In the present invention, it is preferable to fix the value of the reduced pressure in the autoclave so as to have the pressure of the autoclave correspond to a pressure at which water may boil at 45° C. to 55° C. This range is preferred because after cooling the board material to the above boiling point and removing the boards from the autoclave, it is easy to cool the board down to the open air temperature in a short period of time.

The cooling rate of the board material in the autoclave depends on the ratio of area of pores which exist in the outer surfaces of the board material to the volume of the board material. As can be understood from equation (3), the cooling rate of the board material becomes low in proportion to drop of temperature "T" and to approach the value of pressure "$p_2$" of the tiny pores to that of pressure "$p_1$" of the autoclave. In the case of ordinary calcium silicate board material of which the outer surface area is $10^4$–$10^5$ times larger than that of the pores, the cooling period of time is sufficiently short. This fact will be clarified by the example described hereinafter.

On the otherhand, in the case of calcium silicate board material of low porosity in which the ratio of the area of pores to the surface of the board material is $10^{-6}$–$10^{-7}$, the cooling speed of the board material would fade down considerably upon approaching the temperature of the board material in the autoclave to the lowest temperature at which water boils at that reduced pressure.

When the reduced pressure of the autoclave is 100 Torr, the water boiling point of 50° C. corresponds to 110 Torr. In the case of the above mentioned calcium silicate plate of less porosity, the period of time required to reach 70° C. from a board temperature of 150° C. at the end of the aging treatment, is less than 30 minutes. But in this case, when the above mentioned 70° C. is replaced by 50° C., the period of time required becomes several times longer than that of the case of 70° C.

Using board material of low porosity and for example a reduced pressure of 110 Torr, we preferably employ the sequential steps of first subjecting the boards to an aging step as above discussed and then reducing the pressure inside the autoclave to 110 Torr until the board material is reduced in temperature to 70° C. Then the board material is agin heated by feeding saturated steam of high temperature and pressure similar to the steam used for the aging step. The reduced pressure is again applied and maintained at 110 Torr until the temperature of board falls to 70° C. The steam treatment and reduced pressure treatment is repeated alternately thereby to cause drying of the board material. After that the reduced pressure is again applied and maintained at 110 torr until the board temperature reaches 50° C. for the cooling treatment.

In this case, the drying condition, for example, water content $x_1$ of the board which is finished with one cyclic treatment of saturated steam heating and vacuuming, can be understood from equation (5') wherein "T" is 70° C., $x_1$ is initial water content of the board material to be treated with the reduced pressure.

At the beginning of the second cyclic treatment, the water content of the board material can be calculated from equation (5'). However, afterwards, in practice this increases by about 1% by weight because at the beginning of the steam feed, the steam contacts the cooled board material and produces dew on the surfaces of the board in an amount of about 1% by weight. The dew penetrates through existing capillaries into the inner parts of the board. This added 1% by weight of water has been verified by experiments.

Accordingly, the second cyclic treatment, drying degree "x" of the board material by reduced pressure can be approximately calculated from the equation (5') wherein "$x_1$" is substituted by "$x_1'$" and "T" is substituted by 70° C.

Turning now to FIG. 1, there is depicted an autoclave 1 equipped with gas outlet valve 3 and steam supply pipe 2 connected to a boiler (not shown) and via valve 21. The autoclave 1 has a removable cover 11. Vacuum system "A" is connected to the autoclave 1, and comprises valve 4, cooling tanks 5,5 of the multiple pipes type, condensed water tank 6, vacuum pump 7, waste gas exhaust tower 8, and water tank 9. A delivery pump 10 delivers condensed water stocked in condensed water tank 6 to water tank 9. Water supplying pump 11' circulates water in water tank 9 through the cooling pipes of the cooling tanks 5,5. A water exhaust pump 12 is used to exhaust condensed water from autoclave 1 to water tank 9.

The invention is further illustrated with actual examples using the above equipment depicted inf FIG. 1.

EXAMPLE 1

The available area (e.g. capacity of the autoclave) was 1650 m². Unaged raw board material comprising ordinary calcium silicate was prepared by using the usual paper making method. This board material had a size of 450 mm width, 3030 mm length and 11 mm thickness. One thousand two hundred pieces of board material were arranged in an autoclave to stand upright and form a line in the lateral direction. The boards were aged with use of saturated steam of 15 atmospheres, and temperature of 200° C. for 10 hours. After aging, the gas exhaust valve 3 of the autoclave was gradually opened for one hour to make the pressure of the autoclave become normal pressure. Then, the normal pressure was reduced to a pressure of 110 Torr for 10 minutes. The pressure of 110 Torr was maintained for one hour with temperature of the board material being reduced to 50° C. Then, the cover 11 of the autoclave 1 was opened and the board materials were removed. The water content of the board material just after aging was about 60% by weight and jsut after cooling was about 30% by weight.

In this example, the area of the pores was equal to $10^{-4}-10^{-5}$ times the area of the outer surfaces of the board material. The specific heat of the bone dried board material was 0.15 Cal/g.deg. The water content "x" of the board material after cooling was calculated from equation (5') as being 35%, wherein initial water content "$x_1$" of the board material was 50% by weight, initial temperature was 200° C., cooled temperature was 50° C., and latent heat "b" of evaporation was 500 K cal/kg. This value of 35% after cooling was almost equal to 30% which was actually obtained in the above Example 1.

EXAMPLE 2

TLhe board material was prepared by using the usual paper making method with aqueous mixture of water and raw material comprising 100 weight parts of a mixture which comprised silicic acid type material of 15–55% by weight, lime type material of 0.4–1.2 molar times the quantity of the silicic acid type material, cement of 2–20% by weight, asbestos of 5 to 25% by weight, pulp of 1–15% by weight and synthetic fiber of 0.05 to 0.5% by weight, and 1–10 weight parts of light metal salt of monocarbonic acid. The obtained raw board material was aged in an autoclave, cooled and dried. In this case, in order to enable use of the board material as an outer board material, lesser water absorbing properties of the board material of hydrated calcium silicate plate was aimed for. Accordingly, the porosity of the hydrated calcium silicate was aimed to be smaller (e.g. equals to $10^{-6}-10^{-7}$ times the area of the outer surface of the board material) and metal salt of monocarbonic acid was used as a water repellant. In order to maintain the water repellency of the metal salt of monocarbonic acid properly, the aging condition was fixed to be within the range of prssure of saturated steam of 4 to 8 atmospheres, for a time of 8 to 16 hours.

The raw materials were selected to be within the ranges abovementioned for the following reasons.

The quantity of light metal salt of monocarbonic acid is preferably within the range of 1 to 10 weight parts because if it is less than 1 part by weight desirous water repellency cannot be obtained. If it is more than 10 parts by weight, thin sheet layers which are wound onto the making roll of a wet machine are apt to be difficult to peel off. Calcium stearate is a preferred example of a metal salt of monocarbonic acid.

The amount of lime type raw material is limited to be within the range of 0.4 to 1.2 molar times the amount of silicic acid type material to prevent generation of free lime and prevent efflorescense of the obtained product. As the lime type raw material, the following are preferred: unslaked lime, slaked lime, slug of carbide. As the silicic acid type raw material, the following are preferred: diatamceous earth, silicic acid and fine grains, clay, ferrosilicone dust, fly ash. A part of the silicic acid type raw material remains in an unconverted state in the obtained product and functions similar to bones in a matrix.

The total amount of silicic acid type raw material and the lime type raw material is limited to be within a range of 20 to 100 parts by weight. Less than 20 parts is not feasible to realize the lightness of the calcium silicate board material produced. More than 100 parts does not produce sufficient sufficient strength to the peeled off layers nor to the finished product.

The quantity of cement added is within the range of 2 to 20 parts by weight. If it is less than 2 parts, the above mentioned strength of both the peeled off layers and the finished board become undesirably weak. More than 20 parts causes the properties of the calcium silicate material to fade away.

Asbestos exists to enhance the efficiency of the paper making process with solid matter in raw material slurry and to raise the strength and size stability of the obtained product.

Addition of pulp improves the paper making efficiency and workability for sawing and nail driving of the obtained product. The pulp is limited to be within 1 to 15 parts by weight. Less than 1 part does not impart sufficient workability to the product and thus would necessitate addition of more asbestos, such as more than 25 parts by weight. If more than 15 parts by weight of pulp is added, although the amount of asbestos can be reduced to be less than 5 parts by weight, the strength and dimensional stability of the product become reduced.

Synthetic fiber may be used to enhance impact strength of the obtained product. It imparts to the product the properties of resistance to aging. Fibers of polypropylene or polyvinyl alcohol may be used as synthethic fiber. The amount used is preferably between 0.01 to 0.5 parts by weight. If less than 0.01, impact strength is not substantially increased. If more than 0.5, greater than necessary impact strength is obtained, but the workability decreases due to the bulk necessary.

In this example, the above recited raw materials were treated to make homogenous aqueous slurry of 10% by weight concentration by using a pulper with stirring. In this case, water, such as service water, water for industrial use, recovered water which was recovered by filtration from the paper making system and contains a slight amount of the raw material may be utilized. For treating the slurry it is also possible to mix preliminarily, water with pulp, synthetic fiber and light metal salt of monocarbonic acid, and thence to feed resultant slurry together with asbestos, cement, lime type raw material and silicic acid type raw material into the pulper. Slurry obtained by the above-described procedure was stocked once in a chest tank from where the slurry was successively fed into a vat of wet machine. Slurry in vat was treated with paper making cylinder. The thin sheet thus obtained was transported onto a felt belt which has superior water permeability and then wound up onto the making roll until thickness of wound up sheets reaches a fixed one (about 15 mm) and upon reaching this fixed thickness, the wound sheet was cut and peeled off from the making roll and then conveyed onto a press. In this process of peeling off and conveying onto a press, there occured no deformation and no breaking off of the sheet obtained as the sheet had sufficient strength due to the combined compounding with cement material. The obtained raw material board was dehydrated under conventional pressure of 60 to 140 Kg/cm$^2$ by using the above discussed press.

The dehydrated raw board material was charged into the autoclave in piled mass shape and then was primarily aged by ordinary steam feeding into the autoclave. This primary aging had a purpose, namely, to give strength which enables the board material to realize smooth cutting thereof. After this primary aging, the board material was cut into pre-fixed sizes. When no primary aging was used, cutting thereof may be omitted.

The primary aged raw board material was cut and placed upright and formed in line in a lateral direction and subjected to final aging using steam of high temperature and pressure.

By this aging, hydration reaction of cement occured to harden the board material. The hydration reaction of calcium silicate was stopped before reaching the stage at which Tobermonite crystal generation occured, and the porosity of the product was kept sufficiently small. At the same time without thermal decomposition of the light metal monocarbonic acid salt, the product acquired superior water repellency. On account of less porosity and superior water repellency of the board material, the obtained board product had less water absorbing properties.

Of course, since the total amount of lime type raw material would be thoroughly converted to hydrated calcium silicate material through reaction thereof with silicic acid type raw material the product board material obtained does not contain any free lime and has the property of resisting efflorescence during usage.

Furthermore, it is noted that the product has excellent shape stability and superior impact strength since the synthetic fiber used in the process does not melt or decompose during the treating steps.

In this example, an autoclave of size of 1650 m$^2$ was used and 1200 pieces of raw board material of 450 mm width, 3030 mm length, and 11 mm thickness were used.

Figure 2:
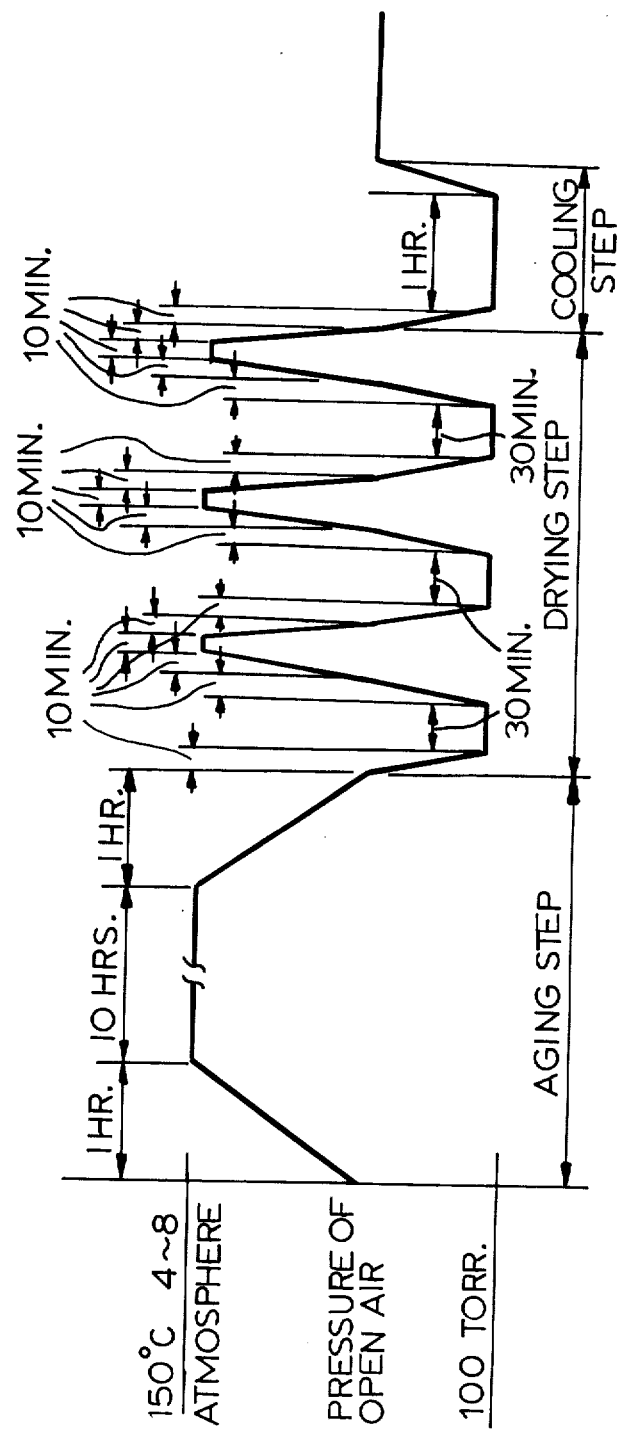
FIG. 2 depicts the steps of application of different pressure with respect to time.

The conditions for aging, cooling and drying treatments were as shown in FIG. 2. That is, aging was done with saturated steam of 150° C., at 5 atmospheres for 10 hours. After aging, the gas exhaust valve 3 was gradually opened for one hour so as to reduce the inside pressure of the autoclave to atmospheric open air pressure. Then, the pressure of the inside of the autoclave was reduced progressively to 110 Torr for about 10 minutes. This reduced pressure was then maintained for 30 minutes so as to reduce the temperature of the board material to be about 70° C. Then, saturated steam of 150° C. at 5 atmosphere was supplied to the autoclave gradually for 20 minutes so as to make the pressure of the inside of the autoclave 5 atmosphere. Then, this 5 atmosphere of the autoclave was maintained for 10 minutes. Then, this pressure was reduced for 10 minutes to atmospheric open air pressure. Then, the above-mentioned cyclic treatment of pressure reducing and steam heating was repeatedly conducted twice. Then, the pressure of the inside of the autoclave was reduced down to 110 Torr for 10 minutes. Thereafter, successively, this reduced pressure state of the autoclave was maintained for 1 hour. At the end of this reduced pressure maintaining for one hour, the temperature of the board material reach about 50° C. The cover of the autoclave was then opened and the cooled boards were removed. The water content was found to be about 15% by weight.

In this example, the initial water content and temperature of the board material just after aging treatment were respectively 150° C. and 50% by weight. The temperature of the saturated steam for reheating the board material was about 140° C. at which vaporization latent heat of water was 520 K cal/kg.

In this example, the water content $x_1'$ after first pressure reducing was calculated to be 41% by weight, wherein $x_1$ corresponded to 50% by weight and $T_1$ was 150° C. After the second prssure reduction treatment the $x_2'$ was calcuted to be 34% by weight, wherein $x_1 = x_1'$ and $T_1 = 140°$ C. After the third pressure reducing treatement the $x_3'$ was 28% by weight. Just after the final pressure reducing treatment the water content $x_4'$ of the board material was calculated from equation (5') wherein $x_1 = x_3'$; $T_1 = 150°$ C., as being 21% by weight.

This water content of 21% by weight can be deemed approximately equal to the actually experimentally obtained water content of 15% by weight. Thus, we can conclude that the water content of the board material which was treated with the above mentioned steps can be calculated quantitatively from equation (5').

The following advantages are obtained by our invention. First, the expenditure for processing equipment is minimized because the autoclave is sufficient to provide reduced pressure and heating and steam which are used for aging, cooling and drying without addition of additional equipment. Second, uniform cooling and drying of the board material is possible without producing any cracks in the board material. Moreover, cooling speed can be controlled easily by adjusting pressure reducing speed. By fixing properly the prssure reducing speed and reduced pressure value, the period of time of drying of the board material can be minimized.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. Method for cooling aged board material comprising the steps of
   (A) aging board material of inorganic substance using saturated steam of high temperature and high pressure for a predetermined period of time in an autoclave;
   (B) reducing the pressure in the autoclave to less than one atmosphere;
   (C) maintaining said reduced pressure at about the same value until the temperature of the board material becomes about the temperature at which water does not boil at the said reduced pressure; and
   (D) removing the board material from said autoclave; wherein said reduced pressure is 110 Torr.

2. Method for cooling aged board material comprising the steps of
   (A) aging board material of inorganic substance using saturated steam of high temperature and high pressure for a predetermined period of time in an autoclave;
   (B) reducing the pressure in the autoclave to less than one atmosphere;
   (C) maintaining said reduced pressure at about the same value until the temperature of the board material becomes about the temperature at which water does not boil at the said reduced pressure; and
   (D) removing the board material from said autoclave; wherein said aging is for a period of at least 10 hours; and said reduced pressure is applied for 1 hour.

3. Method for cooling aged board material comprising the steps of
   (A) aging board material of inorganic substance using saturated steam of high temperature and high pressure for a predetermined period of time in an autoclave;
   (B) reducing the pressure in the autoclave to less than one atmosphere;
   (C) maintaining said reduced pressure at about the same value until the temperature of the board material becomes about the temperature at which water does not boil at the said reduced pressure; and
   (D) removing the board material from said autoclave;
   wherein the temperature at which said water does not boil is 50° C.

4. Method for cooling aged board material, comprising the steps of
   (A) aging board material of inorganic substance using saturated steam of high temperature and high pressure for a predetermined time in an autoclave;
   (B) reducing the pressure within said autoclave to less than one atmosphere and until the temperature of the board material is at a temperature at which water does not boil at said reduced pressure;
   (C) supplying saturated steam again into said autoclave;
   (D) repeating said steps (B) and (C) a predetermined number times; and
   (E) reducing the pressure within said autoclave to be less than one atmosphere;
   (F) maintaining said reduced pressure until the temperature of said board material is at a temperature at which water does not boil at said reduced pressure; and
   (G) removing said board material from said autoclave;
   wherein the reduced pressure is 110 Torr, and the temperature in step (B) at which water does not boil at said reduced pressure is 70° C.

5. Method for cooling aged board material, comprising the steps of
   (A) aging board material of inorganic substance using saturated steam of high temperature and high pressure for a predetermined time in an autoclave;
   (B) reducing the pressure within said autoclave to less than one atmosphere and until the temperature of the board material is at a temperature at which water does no- boil at said reduced pressure;
   (C) supplying saturated steam again into said autoclave;
   (D) repeating said steps (B) and (C) a predetermined number of times; and
   (E) reducing the pressure within said autoclave to be less than one atmosphere;
   (F) maintaining said reduced pressure until the temperature of said board material is at a temperature at which water does not boil at said reduced pressure; and
   (G) removing said board material from said autoclave;
   wherein said aging is for a period of about 10 hours; said reduced pressure is maintained for about 1 hour, and said alternate supplying of steam and reduced pressure are each for about 30 minutes.

6. Method for cooling aged board material, comprising the steps of
   (A) aging board material of inorganic substance using saturated steam of high temperature and high pressure for a predetermined time in an autoclave;
   (B) reducing the pressure within said autoclave to less than one atmosphere and until the temperature of the board material is at a temperature at which water does not boil at said reduced pressure;
   (C) supplying saturated steam again into said autoclave;
   (D) repeating said steps (B) and (C) a predetermined number of times; and
   (E) reducing the pressure within said autoclave to be less than one atmosphere;
   (F) maintaining said reduced pressure until the temperature of said board material is at a temperature at which water does not boil at said reduced pressure; and (G) removing said board material from said autoclave;

wherein said temperature in step (F) at which water does not boil at said reduced pressure is 50° C.

7. Method for cooling aged board material comprising the steps of (A) aging board material of inorganic substance using saturated steam of high temperature and high pressure for a predetermined period of time in an autoclave;

(B) reducing the pressure in the autoclave to less than one atmosphere;

(C) maintaining said reduced pressure at about the same value until the temperature of the board material becomes about the temperature at whcih water does not boil at the said reduced pressure; and (D) removing the board material from said autoclave;

wherein said aging temperature is about 150° to 200° C. at a pressure of between 4 to 8 atmospheres, and said reduced pressure is between 100 to 110 Torr, and said temperature at which said water does not boil is between 45° and 55° C.

* * * * *